United States Patent [19]

Magnino

[11] Patent Number: 5,107,430
[45] Date of Patent: Apr. 21, 1992

[54] METHOD AND A SYSTEM FOR CONTROLLING TRACTION IN MOTOR VEHICLES WITH MECHANICAL GEARBOXES

[75] Inventor: Carlo Magnino, Rivoli, Italy

[73] Assignee: Fiat Auto S.p.A., Turin, Italy

[21] Appl. No.: 633,854

[22] Filed: Dec. 26, 1990

[30] Foreign Application Priority Data

Dec. 29, 1989 [IT] Italy .................................. 68184 A/89

[51] Int. Cl.$^5$ ........................ B60K 28/16; B60K 41/28
[52] U.S. Cl. ................................ 364/426.03; 180/197; 303/109
[58] Field of Search ...................... 364/426.01, 426.02, 364/426.03, 426.04, 431.07, 424.1; 180/197; 303/94–97, 99, 109, 111

[56] References Cited

U.S. PATENT DOCUMENTS

| | | | |
|---|---|---|---|
| 4,796,718 | 1/1989 | Thielen et al. | 192/0.052 |
| 4,807,132 | 2/1989 | Arai et al. | 364/424.1 |
| 4,933,856 | 6/1990 | Leiber | 364/426.01 |
| 4,942,950 | 7/1990 | Watanabe et al. | 180/197 |
| 4,955,448 | 9/1990 | Ise et al. | 364/426.02 |
| 4,989,686 | 2/1991 | Miller et al. | 180/197 |

Primary Examiner—Parshotam S. Lall
Assistant Examiner—Michael Zanelli
Attorney, Agent, or Firm—Sughrue, Mion, Zinn, Macpeak & Seas

[57] ABSTRACT

A method for preventing the driving wheels of a motor vehicle with a mechanical gearbox from slipping consists of detecting the rate of rotation of the vehicle's engine, the speed of the vehicle, the angular velocities of the driving wheels and the gear ratio engaged, and obtaining corresponding signals indicative of the parameters detected. By means of these signals, the rate of rotation of the driving wheels is controlled and reduced automatically to below the slippage threshold by the adjustment of the engagement of the friction clutch, the adjustment of the rate revolution of the engine and the application of a suitable braking torque to one or both of the driving wheels. The control procedure depends on the speed of the vehicle and may also take account of its sideways acceleration.

4 Claims, 1 Drawing Sheet

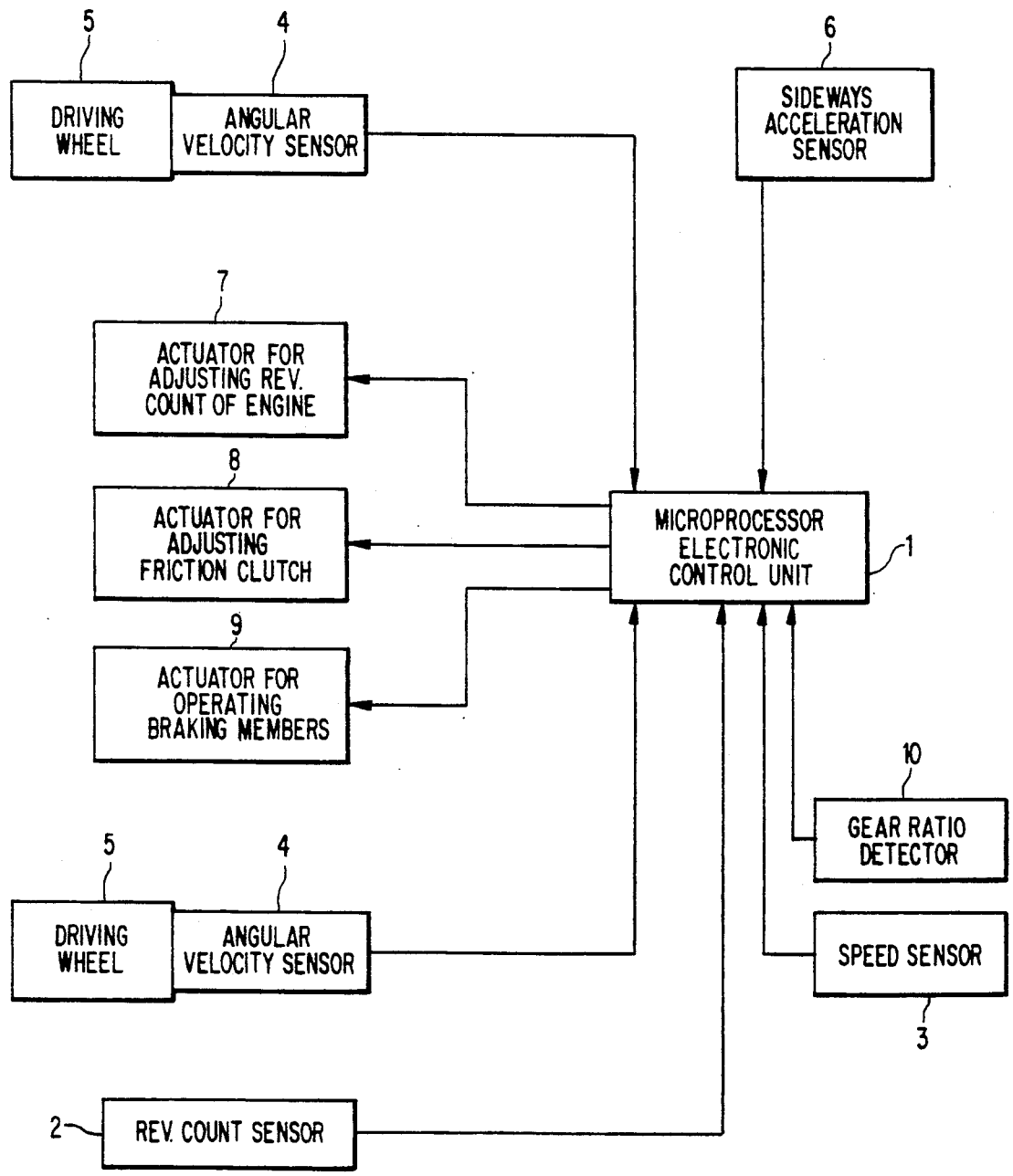

METHOD AND A SYSTEM FOR CONTROLLING TRACTION IN MOTOR VEHICLES WITH MECHANICAL GEARBOXES

BACKGROUND OF THE INVENTION

The present invention relates in general to the control of the traction, that is the road-holding, of the driving wheels of a motor vehicle when it is pulling away from a stationary position and when it is in motion, particularly on road surfaces with non-uniform grips.

More particularly, the invention relates to a method of preventing the driving wheels of a motor vehicle with a mechanical gearbox and a friction clutch from slipping.

Anti-slip systems are known in the art which can be applied to motor vehicles with automatic gearboxes and torque converters. These known systems provide for the intervention of the torque converter to enable the speeds of the driving wheels to be reduced and prevent their slippage, even at low speeds, without risk of the engine stalling.

SUMMARY OF THE INVENTION

The object of the present invention is to provide a method and a system for achieving the same anti-slip control in motor vehicles with mechanical gearboxes and friction clutches.

The method according to the invention is characterised in that it consists of detecting the rate of rotation (rev. count) of the vehicle's engine, the vehicle's speed, the angular velocity of the driving wheels and the gear ratio engaged, and obtaining corresponding signals indicative of the parameters detected whereby the speed of rotation of the driving wheels is controlled automatically and reduced to below the slippage threshold by the following procedures:

between zero speed and a first predetermined vehicle speed: adjusting the engagement of the friction clutch, adjusting the rev. count of the engine, applying a suitable braking torque to one or both of the driving wheels;

between the first predetermined speed and a second, higher predetermined vehicle speed: adjusting the rev. count of the engine and applying a braking torque to one or both of the driving wheels;

between the second predetermined speed and a third, higher predetermined vehicle speed: adjusting the rev. count of the engine;

between the third predetermined speed and a fourth, higher predetermined vehicle speed: adjusting the rev. count of the engine with reduced sensitivity; the control being prevented at speeds above the fourth predetermined vehicle speed.

In order to improve the stability of the car during acceleration, the method also provides for the detection of sideways acceleration of the vehicle and for the provision of corresponding signals indicative of the sideways acceleration detected, whereby the adjustment of the engine's rev. count is prevented when a predetermined threshold of the sideways acceleration is reached, above a predetermined vehicle speed.

In order to carry out the method specified above, the invention provides a system characterised in that it comprises:

means for detecting the rev. count of the vehicle's engine, the vehicle's speed, the angular velocity of the driving wheels and the gear ratio engaged, the detector means being adapted to generate electrical signals indicative of the parameters detected, actuator means for adjusting the rev. count of the engine, for adjusting the engagement of the friction clutch, and for applying a braking torque to one or both of the driving wheels, and an electronic control unit supplied with the electrical signals generated by the detector means and arranged to compare these signals with corresponding reference parameters and consequently to pilot the actuator means so as to automatically control and reduce the speed of rotation of the driving wheels to below the slippage threshold by the procedures specified above.

The electronic unit is arranged to prevent the control at speeds above the aforementioned fourth predetermined vehicle speed.

The system also preferably includes a sensor for sensing the sideways acceleration of the vehicle and for supplying the control unit with electrical signals indicative of the sideways acceleration detected, the control unit also being arranged to prevent the adjustment of the rev. count of the engine when a predetermined threshold of the sideways acceleration is reached, above a predetermined vehicle speed.

BRIEF DESCRIPTION OF THE DRAWING

The invention will now be described in detail with reference to the appended drawing, provided purely by way of non-limiting example, which comprises a block diagram of the traction-control system according to the invention.

DETAILED DESCRIPTION OF THE INVENTION

In brief, with reference to the drawing, the system comprises a microprocessor electronic control unit 1 which is supplied with electrical signals indicative of operating parameters of a motor vehicle when it is starting or in motion, and is arranged to generate control signals, in the manner clarified below, for a series of actuator servo-mechanisms whose intervention automatically reduces the speed of rotation of the driving wheels of the vehicle to below the slippage threshold.

It should be noted that the system according to the invention is usable in motor vehicles with mechanical gearboxes and friction clutches.

More specifically, the detectors which supply the electrical control signals to the electronic unit 1 comprise a sensor 2 for sensing the rev. count of the vehicle's engine, a sensor 3 for sensing the speed of the vehicle and two angular velocity sensors 4 operatively associated with the driving wheels 5 (normally the front wheels) of the vehicle. A sensor 6 for sensing the sideways acceleration of the vehicle and a detector 10 for detecting the gear ratio engaged in the vehicle gearbox are also provided.

The sensors 2, 3, 4, 6 and 10 are of generally known type and within the capabilities of an expert in the art and, for brevity, will not therefore be described.

The electrical signals generated by the sensors are processed by the unit 1 so that they can be compared with reference parameters. In particular, the angular velocity signals provided by the sensors 4 are compared with a reference signal which is calculated in dependence on the vehicle speed and at which the slippage of one or other or both the driving wheels 5 may take place. The actuator servo-mechanisms controlled by the electronic unit 1 include a device 7 for adjusting the rev. count of the engine, a device 8 for adjusting the engagement/disengagement of the friction clutch, and a device 9 for operating braking members associated with one and/or the other of the driving wheels 5.

These devices are also within the knowledge of an expert in the art and, for brevity, will not be described in detail.

In operation, the electronic unit 1, as stated, provides for the automatic control and reduction of the speed of rotation of the driving wheels 5 to below the slippage threshold by acting on the actuators 7, 8 and 9 according to programmed procedures in dependence on the signals supplied to it by the sensors 2, 3, 4, 6 and 10.

The procedure used depends on the speed of the vehicle detected by the sensor 3. More particularly:

from the stationary condition (zero speed) to a first predetermined vehicle speed $V_1$, the unit 1 causes the three actuators 7, 8 and 9 to operate both to adjust the engine's rev. count and to engage the friction clutch, as well as to apply a suitable braking torque to one or both of the driving wheels 5. The slippage of the wheels is prevented by the combined effects of the three actuators.

From the first speed $V_1$ to a second, higher predetermined speed $V_2$, the unit carries out the anti-slip function by acting solely on the actuators 7 and 9, that is by adjusting the engine's rev. count and applying a braking torque to one or both of the driving wheels 5.

From the second speed $V_2$ to a third, higher predetermined speed $V_3$, the unit 1 causes the intervention solely of the actuator 7 so that the anti-slip function is achieved by means of the adjustment of the engine's rev. count alone.

From the third speed $V_3$ to a fourth, higher predetermined speed $V_4$, the unit 1 again acts solely on the actuator 7 but with reduced sensitivity so that the anti-slip function is achieved by fine control of the engine's rev. count.

In any case, the activation of the actuator 7 which adjusts the engine's rev. count is prevented or interrupted when a predetermined threshold of the sideways acceleration of the vehicle detected by the sensor 6 is reached, above a predetermined vehicle speed $V_L$. This improves the stability of the car during acceleration.

By way of example, the speeds mentioned above may be of the following order:

$V_1$: from 0 to 10 km/hour
$V_2$: from 10 to 30 km/hour
$V_3$: from 30 to 90 km/hour
$V_4$: from 90 to 120 km/hour
$V_L$: 120 km/hour.

It should be noted that the engagement of the friction clutch under the control of the actuator 8 is normally enabled when the vehicle's gearbox is in the condition corresponding to the engagement of the first or second gears but is normally prevented for the other gears. The enabling or prevention of engagement of the clutch in dependence on the gear ratio engaged is achieved through the signals provided by the detector 10.

Naturally, the details of construction and forms of embodiment may be varied widely with respect to those described and illustrated, without thereby departing from the scope of the present invention.

I claim:

1. A method for preventing the slippage of the driving wheels of a motor vehicle with a mechanical gearbox and a friction clutch consisting of detecting the rate of rotation of the vehicle's engine, the vehicle's speed, the angular velocity of the driving wheels (5) and the gear ratio engaged and obtaining corresponding signals indicative of the parameters detected whereby the speed of rotation of the driving wheels (5) is controlled automatically and reduced to below the slippage threshold by the following procedures:

between zero speed and a first predetermined vehicle speed ($V_1$): adjusting the engagement of the friction clutch, adjusting the rate of revolution of the engine, applying a suitable braking torque to one or both of the driving wheels;

between the first predetermined speed ($V_1$) and a second, higher predetermined vehicle speed ($V_2$): adjusting the rate of revolution of the engine and applying a braking torque to one or both of the driving wheels;

between the second predetermined speed ($V_2$) and a third, higher predetermined vehicle speed ($V_3$): adjusting the rate of revolution of the engine;

between the third predetermined speed ($V_3$) and a fourth, higher predetermined vehicle speed ($V_4$): adjusting the rate of revolution of the engine with reduced sensitivity;

the control being prevented at speeds above the fourth predetermined vehicle speed ($V_4$).

2. A method according to claim 1 further providing for the detection of the sideways acceleration of the vehicle and the provision of corresponding signals indicative of the sideways acceleration detected whereby the adjustment of the rate of revolution of the engine is prevented when a predetermined threshold of the sideways acceleration is reached, above a predetermined vehicle speed ($V_L$).

3. A system for preventing the slippage of the driving wheels (5) of a motor vehicle with a mechanical gearbox and a friction clutch, comprising:

means (2, 3, 4, 10) for detecting the rate of rotation of the vehicle's engine, the vehicle's speed, the angular velocity of the driving wheels and the gear ratio engaged, the detector means being adapted to generate electrical signals indicative of the parameters detected, actuator means (7, 8, 9) for adjusting the rate of revolution of the engine, for adjusting the engagement of the friction clutch, and for applying a braking torque to one or both of the driving wheels, and an electronic control unit (1) supplied with the electrical signals generated by the detector means (2, 3, 4, 10) and arranged to compare these signals with corresponding reference parameters and consequently to pilot the actuator means (7, 8, 9) so as to automatically control and reduce the speed of rotation of the driving wheels (5) to below the slipping threshold by the following procedures:

between zero speed and a first predetermined vehicle speed ($V_1$): adjusting the engagement of the friction clutch, adjusting the rate of revolution of the engine, applying a suitable braking torque to one or both of the driving wheels;

between the first predetermined speed ($V_1$) and a second, higher predetermined vehicle speed ($V_2$): adjusting the rate of revolution of the engine and applying a braking torque to one or both of the driving wheels (5);

between the second predetermined speed ($V_2$) and a third, higher predetermined vehicle speed ($V_3$): adjusting the rate of revolution of the engine;

between the third predetermined speed ($V_3$) and a fourth, higher predetermined vehicle speed ($V_4$): adjusting the rate of revolution of the engine with reduced sensitivity;

the electronic unit (1) also being arranged to prevent the control being effected at speeds above the fourth predetermined vehicle speed ($V_4$).

4. A system according to claim 3, further including a sensor (6) for sensing the sideways acceleration of the vehicle and for supplying the control unit (1) with electrical signals indicative of the sideways acceleration detected, and in that the control unit (1) is also arranged to prevent the adjustment of the rate of revolution of the engine when a predetermined threshold of the sideways acceleration is reached, above a predetermined vehicle speed ($V_L$).

* * * * *

UNITED STATES PATENT AND TRADEMARK OFFICE
CERTIFICATE OF CORRECTION

PATENT NO.   :   5,107,430

DATED        :   April 21, 1992

INVENTOR(S) :    Carlo MAGNINO

It is certified that error appears in the above-identified patent and that said Letters Patent is hereby corrected as shown below:

On the title page, item [30] should read as follows:

[30]         Foreign Application Priority Data
    Dec. 28, 1989 [IT]    Italy .............68184 A/89

Signed and Sealed this

Thirtieth Day of November, 1993

Attest:

BRUCE LEHMAN

Attesting Officer

Commissioner of Patents and Trademarks